Sept. 26, 1944.   A. W. BAUMANN   2,359,078
EVAPORATOR
Filed Aug. 28, 1942

Inventor
Arnold W. Baumann
by
his Attorneys

Patented Sept. 26, 1944

2,359,078

UNITED STATES PATENT OFFICE 2,359,078

EVAPORATOR

Arnold W. Baumann, Chicago, Ill.

Application August 28, 1942, Serial No. 456,507

4 Claims. (Cl. 159—31)

This invention relates to an evaporator of the type known as a "vacuum pan" and intended for use in the condensation of milk or other liquids.

One object of the invention is to provide automatic means for maintaining a uniform vapor velocity through the stack which connects the evaporating chamber with the separation chamber of the apparatus.

Another object is to provide means for maintaining a uniform pressure differential as between the evaporating chamber and the separation chamber.

A further object of the invention is to provide means for maintaining a uniform vapor velocity in the passage which connects the two chambers and a uniform pressure differential between said chambers by gradually and automatically altering the area of the outlet through which the vapor passes from the evaporating chamber to the separation chamber.

More specifically, it is an object of the invention to provide a spring-controlled deflector mounted over the stack which leads from the evaporating chamber to the separation chamber, said deflector being spaced from the stack by a distance which varies as the deflector is moved in response to changes of vapor pressure.

It is also an object of the invention to provide the separating chamber with a specially formed bottom wall adapted to drain and remove precipitated milk as promptly as possible from said chamber.

And a further object of the invention is to provide means for preventing the passage of condensed liquid or entrained solid matter from the separating chamber into the suction outlet thereof.

Other objects and advantages will appear from the following description taken in connection with the drawing in which.

Figure 1:
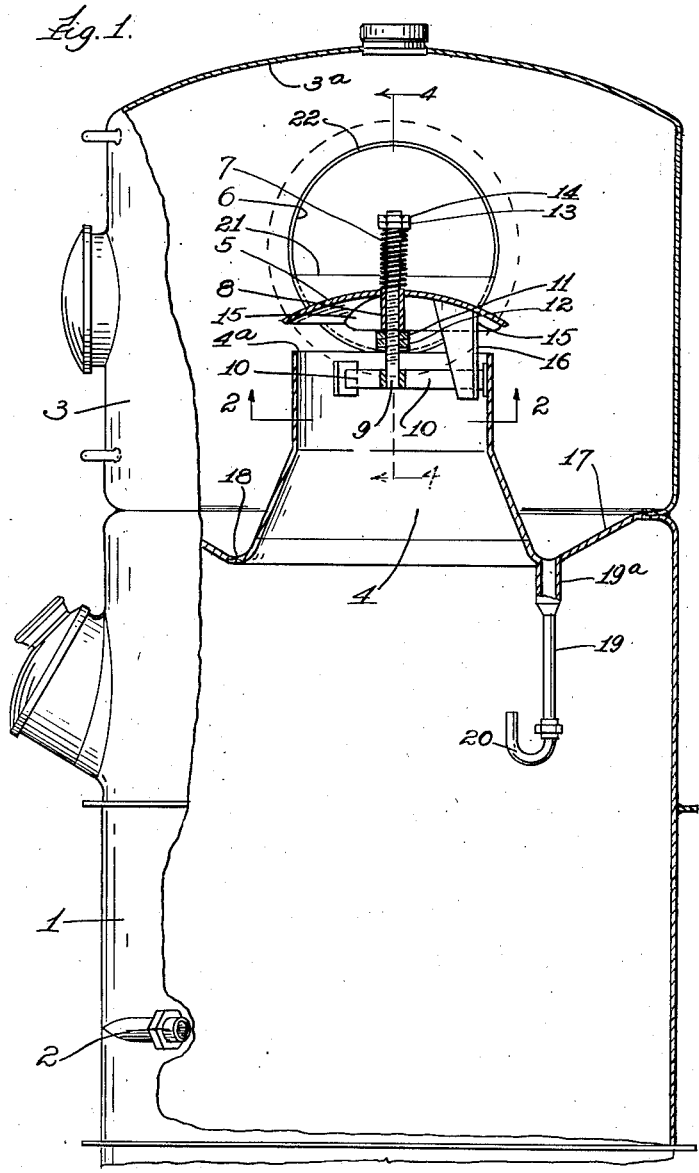
Figure 1 is a side elevation of the evaporator embodying this invention, a portion of the side wall being broken away to reveal certain details of the internal construction and the lower portion of the structure being omitted.
Figure 2:
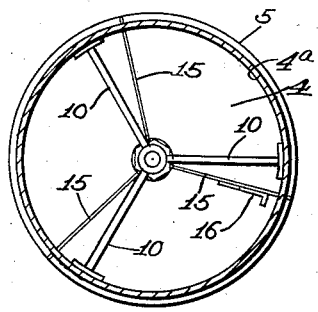
Figure 2 is a detail section taken as indicated at line 2—2 on Figure 1 and looking upwardly at the under side of the deflector.

The evaporator or "vacuum pan" illustrated in the drawing as embodying this invention is of the same general type as that shown in my U. S. Patent No. 2,172,236, dated September 5, 1939, and is designed primarily for the condensation of milk, although a similar structure may be employed for other liquids. The present construction includes a lower chamber 1 into which the liquid to be treated, such as milk, is fed, for example, through a tangentially arranged inlet 2, and where it is subjected to heat which may be provided by steam coils in the lower portion of the chamber. Such coils are shown in my aforesaid Patent No. 2,172,236, but are omitted from the present drawing. Above the chamber 1 is the vacuum chamber 3 which operates as an entrainment separator for the vapor rising from the heated liquid in the lower chamber 1. The vapor outlet or stack 4 extends from the top of the chamber 1 upwardly into the chamber 3 and a deflector 5 is supported over the top of the stack 4 at a distance from its upper edge 4ª so as to form an annular and lateral outlet for the vapor issuing from the stack. At one side of the chamber 3 an outlet 6 leads to source of suction, usually by way of a condenser (not shown) for disposing of the vapor which is separated from the solids of the milk or other liquid being treated in the apparatus.

In the condensation of milk the operation of the suction apparatus acting through the outlet 6 maintains a partial vacuum of approximately 25⅜ inches to 25½ inches of mercury in the upper chamber 3, while a vacuum of about 25 inches of mercury is present in the evaporating chamber 1. This pressure differential induces the flow of vapor from the evaporating chamber through the stack 4 as the application of heat transforms a portion of the liquid into vapor in the lower chamber, and the velocity of the vapor leaving the chamber 1 is such that a considerable quantity of solid matter is entrained in it and carried into the upper chamber. But upon encounter with the deflector 5 the vapor is forced to issue laterally through the annular outlet formed between the upper edge of the stack and the deflector.

In the relatively violent boiling of the liquid which takes place in the evaporating chamber 1 some of the solids are carried into the vapor in the form of small bubbles. When these bubbles are formed in the lower chamber the vapor core on the inside of each bubble is at a pressure identical with the vapor pressure in the chamber 1, but as these bubbles are carried by the vapor through the stack 4 into the upper chamber 3, the higher vacuum in this upper chamber produces a pressure differential between the inside and the outside of the bubble, causing such great surface tension that the bubble bursts, freeing the vapor and allowing the liquid and solid elements which compose its wall to be precipitated in the chamber 3. Thus it will be evident that the maintenance of the pressure differential between the evaporating chamber 1 and the entrainment separation chamber 3 is an important factor in securing maximum efficiency of the apparatus.

The evaporator shown in my said Patent No. 2,172,236 is well adapted for use in concentrating milk products at a uniform rate of concentration by a continuous process, with the milk flowing into the evaporating pan at a substantially uniform rate, and with the finished product in the form of thick condensed milk being pumped from the bottom of the pan. With such a process the rate of evaporation is uniform, with a resulting substantially uniform vapor velocity through the separation chamber. Accordingly, in my patent the deflector is shown fixedly mounted over the stack through which the vapor flows from the lower chamber into the upper chamber.

But, generally, when the finished product is to contain more than thirty percent solids, as, for example, in the case of sweetened condensed milk, a batch method of condensing is employed. At the beginning of the operation, when the milk is fluid, the rate of evaporation may be as much as three times as great as it will be toward the end of the process, as the milk becomes heavier and more sluggish. Under these conditions, in order to maintain a uniform vapor velocity through the stack, it becomes necessary to decrease the area between the upper edge of the stack and the deflector correspondingly as the rate of evaporation in the lower chamber 1 is reduced. This is accomplished by mounting the deflector 5 for vertical movement toward and from the upper edge 4ª of the stack 4, and employing a spring 7 to hold it yieldingly downward against the vapor pressure acting on the under side of the deflector. The tension of the spring 7 is adjusted so that the annular opening between the edge of the stack and the deflector 5 can accommodate itself to changes in vapor pressure and in such proportion thereto as to maintain a correct outlet area which will insure a uniform vapor velocity through the stack.

Figure 3:
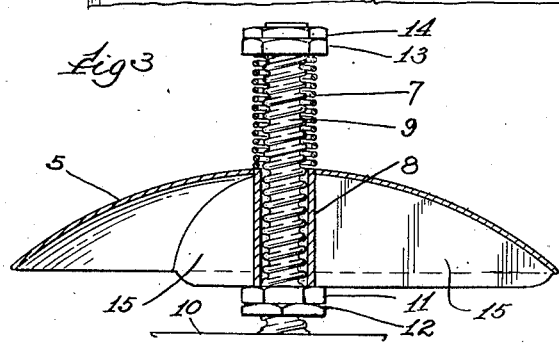
Figure 3 is an axial sectional view of the deflector and its supporting means taken on a larger scale than in Figure 1.

The deflector 5 is provided with a hollow hub or sleeve 8 extending rigidly from its under surface at the center and fitting slidably over a stem 9 which is supported rigidly at the axis of the stack 4 by suitable radially disposed bracket arms 10. The stem or guide 9 projects upwardly for a substantial distance above the deflector 5, and is provided with threads which extend both above the deflector and beyond the lower end of the sleeve 8. A stop nut 11 and jam nut 12 are adjustably fitted to the threaded portion of the stem 9 below the sleeve to determine the minimum capacity of the outlet between the stack and the deflector. The spring 7 coiled about the upper portion of the stem 9 reacts between the deflector 5 and an adjustable stop nut 13 on the stem, and a lock nut 14 secures the stop 13 at adjusted position. Preferably, the spring 7 and the stem 9, with their associated parts, are made of stainless steel, which is unaffected by contact with the products treated in the apparatus, and to facilitate the thorough cleansing of the apparatus the thread in the stem 9 is of a "sanitary" form, which, as shown in Figure 3, is of rounded contour in cross-section, so that there shall be no sharp angles from which it would be difficult to remove accumulated solid matter.

The under side of the deflector 5 is concave, and is provided with radially disposed vanes or baffles 15 which serve to check any swirling motion which the vapor may acquire in the stack 4. A lug 16 extends from one of the vanes 15 into engagement with one of the bracket arms 10 to check any rotative tendency of the deflector itself.

Thus, in the operation of the condenser by the batch method, the yieldingly mounted deflector 5 automatically responds to changes in the pressure of the vapor flowing past it and effects a gradual decrease in the outlet area between the stack and the deflector as the rate of evaporation is progressively reduced. As a result, a uniform vapor velocity through the stack and a uniform pressure differential between the evaporating and the separation chamber are maintained throughout the process.

When liquid and solid matter are precipitated in the separation chamber 3 it is important to remove them therefrom as quickly as possible, because at the higher vacuum maintained in the separation chamber the precipitated milk is exposed to the possibility of re-evaporation at a correspondingly lower boiling point. Such re-evaporation would tend to occur rather violently so as to carry off some of the milk solids which would thus escape through the outlet 6 of the condenser, and would be lost. Therefore, to facilitate removal of the precipitated milk the bottom wall 17 of the chamber 3 is dished, with substantially all its area sloping inwardly to form an annular trough 18 around the base of the stack 4, and a drain pipe 19, with an enlarged upper receiving portion 19ª, extends from the trough into the evaporating chamber 1, where it terminates in an upwardly open gooseneck 20. The latter feature tends to prevent the rising vapor currents in the chamber 1 from interfering with the downflow of the condensed liquid through the pipe 19. Heretofore, a collecting trough has been provided in the bottom of the separation chamber 3, but adjacent its outer wall with several outlet pipes extending into the evaporating chamber; but by locating the trough 18 close to the stack 4 it is much shorter than in the previous design, so that the precipitated milk has only a short distance to travel in the trough in order to reach the discharge outlet pipe 19, and, ordinarily, one such outlet is sufficient. The inward pitch of the separator bottom 17 thus contributes materially to saving a high percentage of the matter precipitated in the separation chamber and also facilitates cleaning of the chamber by affording effective drainage for the cleaning fluid.

Figure 4:
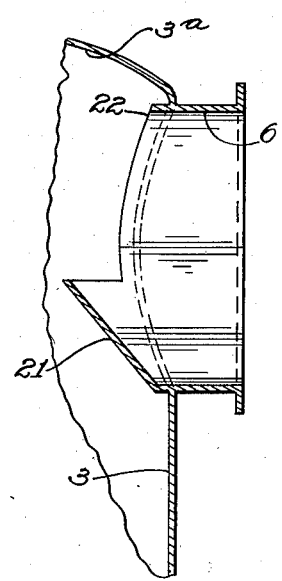
Figure 4 is a vertical detail section of a suction outlet connection being taken as indicated at line 4—4 on Figure 1.

With the outlet 6 located in the side wall of the separation chamber 3, and almost opposite the annular outlet of the stack 4, it becomes necessary to prevent direct flow of the vapor from the stack into the outlet 6. For this purpose an inclined baffle 21, extending at approximately 45 degrees to the vertical, is mounted over the lower portion of the outlet 6, which is the area nearest to the outlet of the stack 4. The presence of this baffle forces the vapor flowing from the stack toward the outlet 6 to reverse its direction of movement before it can escape over the upper edge of the baffle 21, thus affording time for the precipitation of solids and condensed liquid. This precipitated matter will accumulate, to some extent, on the top and side walls of the chamber 3, and will tend to "creep" along these surfaces in a generally downward direction. To prevent this creeping film from being washed directly into the outlet 6 by the flow of vapor, I provide an inwardly extending flange or dam 22 at the rim of the outlet 6 which thus leads the film of milk from the top wall 3ª of the chamber 3 downwardly past the outlet to the lower portion of the side wall, so that it will gravitate toward the trough 18 for return to the evaporating chamber. As shown in Figure 4, the flange 22 may be joined with the baffle 21 so as to support the same in position.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim as my invention:

1. In an evaporator, an evaporating chamber, a separation chamber superimposed thereon, a wall between said chambers with an upwardly directed stack extending into the separation chamber, a stem axially disposed in said stack and extending above the upper end thereof, a deflector slidably mounted on said stem, a stop on said stem holding the deflector at a minimum distance away from the end of the stack, and yielding means responsive to the vapor pressure in the stack for controlling the width of the lateral outlet formed between the edge of the stack and the said deflector.

2. In an evaporator, an evaporating chamber, a separation chamber superimposed thereon, a wall between said chambers with an upwardly directed stack extending into the separation chamber, a stem supported axially in the stack and extending above it, a deflector disposed directly over the stack initially spaced from the edge of the stack and slidably mounted on said stem, and a spring coiled about the stem above the deflector and yieldable in response to variations of vapor pressure in the stack to alter the width of the lateral outlet formed between the edge of the stack and said deflector.

3. In an evaporator, an evaporating chamber, a separation chamber superimposed thereon, a wall between said chambers with an upwardly directed stack extending into the separation chamber, a threaded stem and a deflector slidably mounted thereon directly over the stack and spaced therefrom, together with a spring on said stem reacting between the deflector and an adjusting nut on the stem whereby said spring may be tensioned to control the position of the deflector in response to variations in the pressure of vapor flowing from the stack past the deflector, together with a stop nut adjustable on the stem determining the initial spacing between the deflector and the stack.

4. In an evaporator, an evaporating chamber, a separation chamber superimposed thereon, a wall between said chambers with an upwardly directed stack extending into the separation chamber, a threaded stem supported adjacent the upper end of the stack, a deflector slidably mounted on the stem over the stack and initially spaced therefrom, an adjustable stop nut limiting the movement of the deflector toward the stack, and a spring resisting movement of the deflector in the opposite direction whereby the deflector is adapted to yield in response to increase of the pressure of the vapor issuing from the stack.

ARNOLD W. BAUMANN.